United States Patent
Yokoyama

(10) Patent No.: US 10,816,053 B2
(45) Date of Patent: Oct. 27, 2020

(54) HYDRAULIC BRAKE

(71) Applicant: TOYOTA JIDOSHA KABUSHIKI KAISHA, Toyota-shi, Aichi-ken (JP)

(72) Inventor: Tomohiro Yokoyama, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 15 days.

(21) Appl. No.: 16/169,539

(22) Filed: Oct. 24, 2018

(65) Prior Publication Data

US 2019/0178320 A1 Jun. 13, 2019

(30) Foreign Application Priority Data

Dec. 8, 2017 (JP) .................. 2017-235831

(51) Int. Cl.
| | |
|---|---|
| *F16D 55/227* | (2006.01) |
| *F16D 65/72* | (2006.01) |
| *F16D 65/097* | (2006.01) |
| *F16D 55/226* | (2006.01) |
| *F16D 121/04* | (2012.01) |
| *F16D 125/10* | (2012.01) |

(Continued)

(52) U.S. Cl.
CPC .......... *F16D 65/72* (2013.01); *F16D 55/226* (2013.01); *F16D 65/0971* (2013.01); *F16D 55/227* (2013.01); *F16D 65/0972* (2013.01); *F16D 65/18* (2013.01); *F16D 2055/002* (2013.01); *F16D 2055/007* (2013.01); *F16D 2121/04* (2013.01); *F16D 2125/10* (2013.01)

(58) Field of Classification Search
CPC ....... F16D 2055/0016; F16D 2055/002; F16D 2055/0025; F16D 2200/0034; F16D 2200/0039; F16D 2200/0047; F16D 2200/0052; F16D 65/0068; F16D 65/0075; F16D 2125/04
USPC ........................................ 188/370
See application file for complete search history.

(56) References Cited

U.S. PATENT DOCUMENTS 3,428,152 A * 2/1969 Hoenick ............. F16D 55/2262
188/72.5
3,493,084 A * 2/1970 Maurice ............. F16D 55/2262
188/72.5

(Continued)

FOREIGN PATENT DOCUMENTS

| JP | 10-122272 A | 5/1998 | |
|---|---|---|---|
| WO | WO-2014091423 A2 * | 6/2014 | ........... F16D 55/228 |

*Primary Examiner* — Bradley T King
(74) *Attorney, Agent, or Firm* — Sughrue Mion, PLLC

(57) ABSTRACT

A hydraulic brake includes: an inner pad and an outer pad located to sandwich a rotor configured to rotate with a wheel between the inner pad and the outer pad; a wheel cylinder including a cylinder body including a cylinder bore, a hydraulic pressure chamber formed in the cylinder body, and a first piston liquid-tightly and slidably fitted in the cylinder bore and configured to be moved by a hydraulic pressure in the hydraulic pressure chamber so as to press the inner pad against the rotor; and a drive member configured to be moved, by the hydraulic pressure in the hydraulic pressure chamber, in a direction opposite to a direction in which the first piston moves, so as to press the outer pad against the rotor. The cylinder body includes a fragile portion at a portion corresponding to the hydraulic pressure chamber.

7 Claims, 10 Drawing Sheets

(51) Int. Cl.
*F16D 55/00* (2006.01)
*F16D 65/18* (2006.01)

(56) References Cited

U.S. PATENT DOCUMENTS

| | | | | |
|---|---|---|---|---|
| 3,552,182 A * | 1/1971 | Handler | ............ | B21D 5/02 |
| | | | | 72/432 |
| 3,933,226 A * | 1/1976 | Maurice | ............ | F16D 55/226 |
| | | | | 188/72.5 |
| 4,306,639 A * | 12/1981 | Mitchell | ............ | F16D 65/18 |
| | | | | 188/216 |
| 4,570,531 A * | 2/1986 | Anderson | ............ | F16D 55/40 |
| | | | | 188/196 A |
| 5,168,964 A * | 12/1992 | Shimmell | ............ | F16D 55/226 |
| | | | | 164/98 |
| 5,887,684 A * | 3/1999 | Doll | ............ | B22C 9/046 |
| | | | | 188/370 |
| 2010/0170755 A1 * | 7/2010 | Biggs | ............ | F16D 55/224 |
| | | | | 188/72.4 |
| 2010/0181151 A1 * | 7/2010 | Bingham, Jr. | ............ | F16D 55/40 |
| | | | | 188/72.4 |
| 2011/0215567 A1 * | 9/2011 | Hurwitz | ............ | F16D 1/072 |
| | | | | 285/256 |
| 2014/0158488 A1 * | 6/2014 | Valle | ............ | F16D 65/0068 |
| | | | | 188/370 |

* cited by examiner

HYDRAULIC BRAKE

INCORPORATION BY REFERENCE

The disclosure of Japanese Patent Application No. 2017-235831 filed on Dec. 8, 2017 including the specification, drawings and abstract is incorporated herein by reference in its entirety.

BACKGROUND

1. Technical Field

The disclosure relates to a hydraulic brake.

2. Description of Related Art

Japanese Unexamined Patent Application Publication No. 10-122272 (JP 10-122272 A) discloses a hydraulic brake including (a) an inner pad and an outer pad that are located so as to sandwich therebetween a rotor configured to rotate with a wheel, (b) a caliper, and (c) a wheel cylinder provided in the caliper. In the disclosed hydraulic brake, a generally arc-shaped recess is formed on the caliper at a portion that abuts against the outer pad, and a linear member having an outer diameter greater than an inner diameter of the recess is disposed in the recess. When the hydraulic brake is operated, the linear member abuts against the outer pad by the movement of the caliper so that the outer pad is pressed against the rotor. Consequently, variation in position of the caliper where the caliper abuts against the outer pad becomes small so that the effect of suppressing noise of the hydraulic brake can be stabilized.

SUMMARY

The disclosure provides a hydraulic brake with reduced weight.

An aspect of the disclosure provides a hydraulic brake including: an inner pad and an outer pad located to sandwich a rotor configured to rotate with a wheel between the inner pad and the outer pad; a wheel cylinder including a cylinder body including a cylinder bore, a hydraulic pressure chamber formed in the cylinder body, and a first piston liquid-tightly and slidably fitted in the cylinder bore and configured to be moved by a hydraulic pressure in the hydraulic pressure chamber so as to press the inner pad against the rotor; and a drive member configured to be moved, by the hydraulic pressure in the hydraulic pressure chamber, in a direction opposite to a direction in which the first piston moves, so as to press the outer pad against the rotor. The cylinder body includes a fragile portion at a portion corresponding to the hydraulic pressure chamber.

In a hydraulic brake according to the disclosure, a fragile portion is formed in a cylinder body of a wheel cylinder. For example, when maintenance of the hydraulic brake or replacement of at least part of the hydraulic brake is performed upon the occurrence of leakage of working fluid due to damage to the fragile portion, it is possible to prevent damage to other portions, such as a drive member, of the hydraulic brake. As a result, it is possible to reduce the weight of the other portions, such as the drive member, of the hydraulic brake.

In the above aspect, the fragile portion may be provided at a portion, outside a sliding portion of the first piston, of the cylinder body.

In the above aspect, at least part of the drive member may be made of carbon fiber reinforced plastic.

In the above aspect, the hydraulic brake may include a housing attached to a non-rotary member and holding the inner pad and the outer pad. The cylinder bore may be provided in the housing; the cylinder body may be a portion, where the cylinder bore is formed, of the housing; the wheel cylinder may include a second piston, the second piston being liquid-tightly and slidably fitted in the cylinder bore and being configured to be moved in the direction, by the hydraulic pressure in the hydraulic pressure chamber, opposite to the direction in which the first piston moves; and the drive member may be a frame held by the housing so as to be relatively movable, the frame being a frame-shaped rigid body and including a portion engaging the second piston and a portion facing the outer pad, the frame configured to be moved, by the second piston, in the direction opposite to the direction in which the first piston moves.

In the above aspect, the drive member may be a caliper held by a non-rotary member so as to be movable in a direction parallel to a rotation axis of the rotor; the cylinder bore may be provided in the caliper; and the cylinder body may be a portion, where the cylinder bore is formed, of the caliper.

In the above aspect, the fragile portion may have a strength less than a strength of a portion of the cylinder body other than the fragile portion.

In the above aspect, the fragile portion may be provided at a position overlapping at least part of the hydraulic pressure chamber in an axial direction of the cylinder body.

In the above aspect, a thickness of the cylinder body at the fragile portion may be less than a thickness of the cylinder body at a portion other than the fragile portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
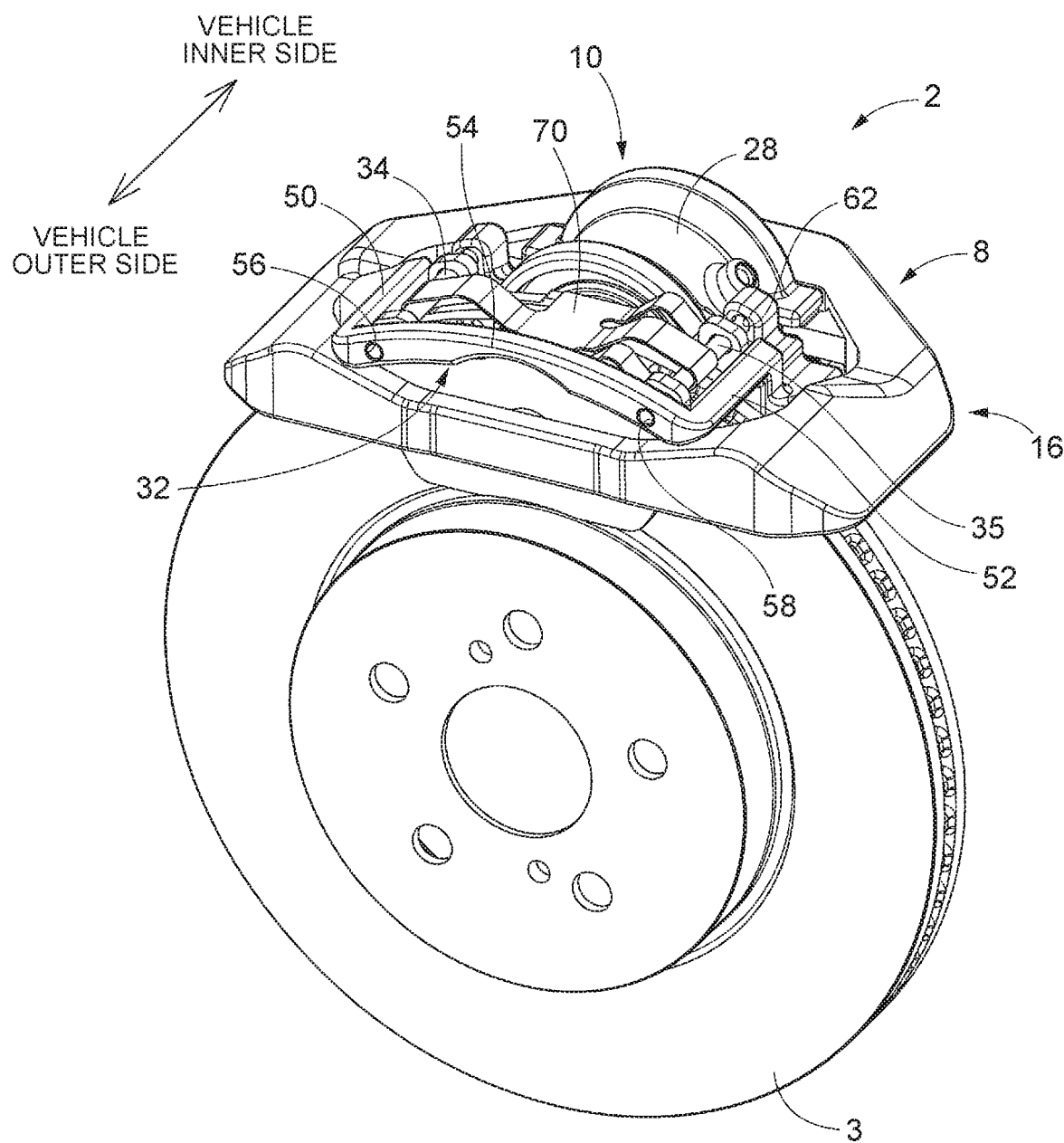
FIG. 1 is a perspective view of a disc brake being a hydraulic brake according to a first embodiment of the disclosure.

Hereinafter, a disc brake as a hydraulic brake attached to a wheel of a vehicle according to an embodiment of the disclosure will be described with reference to the drawings.

First Embodiment

A. Summary

A disc brake 2 according to this embodiment is of the floating type and is a hydraulic disc brake that is operated by the hydraulic pressure. Disc brakes 2 are components of a hydraulic brake system shown in FIG. 14 and are respectively attached to right and left front wheels. As shown in FIGS. 1 to 4, the floating-type hydraulic disc brake 2 includes (I) an inner pad 4 and an outer pad 6 that are located on both sides of a rotor 3 so as to sandwich therebetween the rotor 3 that is rotated together with the wheel, (II) a pressing device 8, and (III) a housing 10 supporting the pressing device 8. The pressing device 8 includes a wheel cylinder 14 and a frame 16.

The wheel cylinder 14 includes a first piston 24 as a first pressing member and a second piston 26 as a second pressing member that are liquid-tightly and slidably fitted in a cylinder bore 21 formed in a main housing portion 28 of the housing 10. A hydraulic pressure chamber 30 is defined between the first piston 24 and the second piston 26 in the cylinder bore 21. Piston seals 24s, 26s are respectively provided between the first piston 24 and the cylinder bore 21 and between the second piston 26 and the cylinder bore 21, and therefore, strictly speaking, the hydraulic pressure chamber 30 is defined as a portion surrounded by the piston seals 24s, 26s and the cylinder bore 21. In this way, while the wheel cylinder 14 is provided in the main housing portion 28, it can be considered that a portion, formed with the cylinder bore 21, of the main housing portion 28 is a cylinder body 14h being the body of the wheel cylinder 14 so that the wheel cylinder 14 is held by the main housing portion 28. The frame 16 is a frame-shaped rigid body and is held by the main housing portion 28 so as to be relatively movable in the direction parallel to the rotation axis L of the rotor 3.

Figure 2:
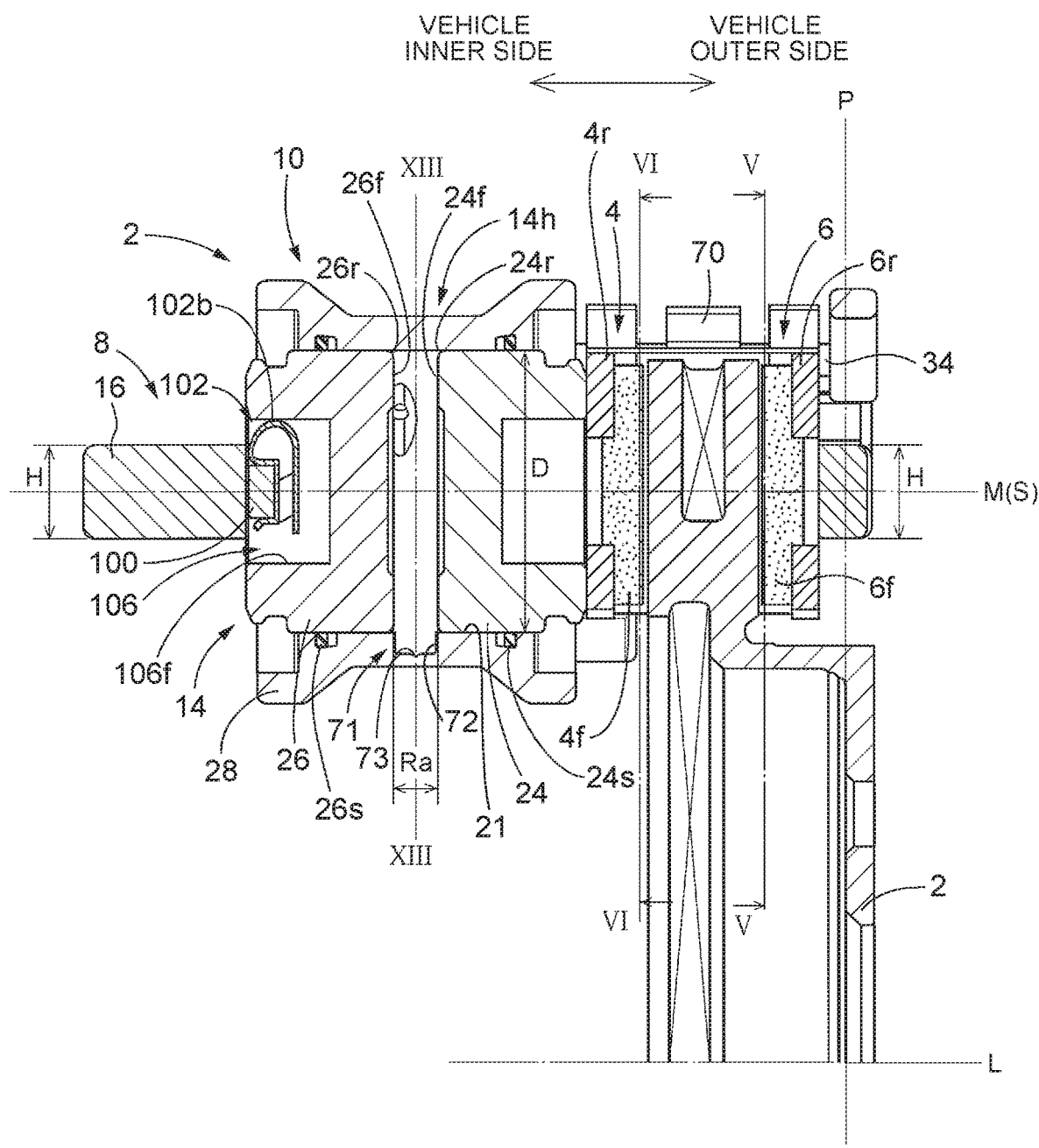
FIG. 2 is a sectional view showing a main portion of the disc brake.

The rotation axis L of the rotor 3 is parallel to the axis M of the pressing device 8, and therefore, hereinafter, the direction parallel to the rotation axis L of the rotor 3 may be referred to as the axial direction of the pressing device 8 or simply as the axial direction, or as the direction parallel to the axis M. As shown in FIGS. 1 and 2, in the direction parallel to the axis M, the side where the main housing portion 28 is located is the vehicle inner side, and the side where the outer pad 6 is located is the vehicle outer side.

Figure 11:
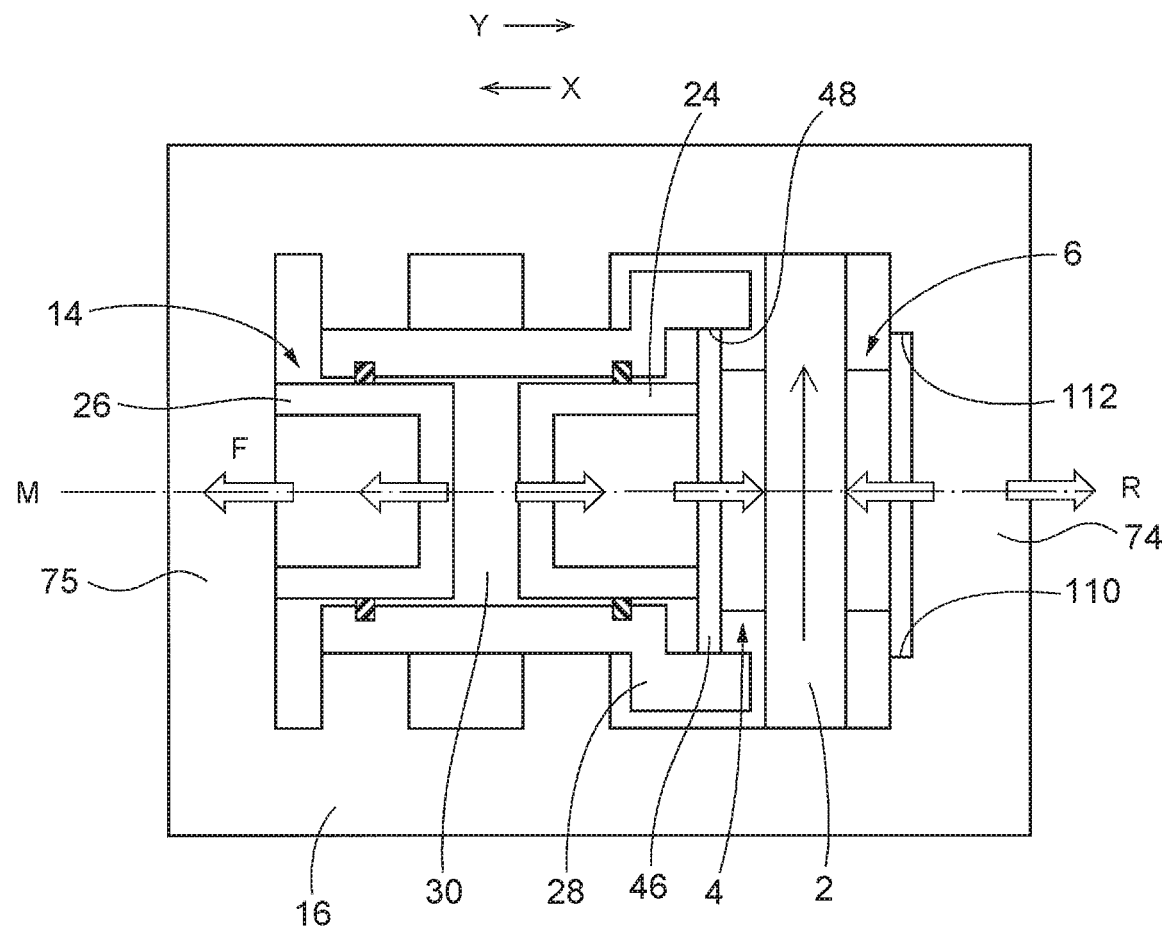
FIG. 11 is a diagram schematically showing the operation of the disc brake.

As shown in FIG. 11, the disc brake 2 is operated when the hydraulic pressure is supplied to the hydraulic pressure chamber 30 of the wheel cylinder 14. The first piston 24 is moved parallel to the axis M toward the rotor 3, and the second piston 26 is moved parallel to the axis M in the direction away from the rotor 3. The first piston 24 presses the inner pad 4 against the rotor 3, and the second piston 26 moves the frame 16 in the direction of arrow X. With the movement of the frame 16 in the direction of arrow X, the outer pad 6 is pressed against the rotor 3. The rotor 3 is pressed by the inner pad 4 and the outer pad 6 from its both sides so that the disc brake 2 is in the operating state. Details will be described below.

B. Inner Pad, Outer Pad

The inner pad 4 and the outer pad 6 respectively include back plates 4r, 6r and friction engagement members 4f, 6f.

C. Housing

The housing 10 includes (a) the main housing portion 28, (b) a bridge portion 32 extending from the main housing portion 28 across the rotor 3, (c) a pair of pad pins 34, 35 spaced apart from each other in the circumferential direction of the rotor 3, and so on. The main housing portion 28 extends generally in the axial direction, and the cylinder bore 21 is formed in the main housing portion 28 so as to pass through the main housing portion 28 in the direction parallel to the axis M. The first piston 24 and the second piston 26 each have a bottomed hollow cylindrical shape and are concentrically fitted in the cylinder bore 21 in tandem in the axial direction in a posture in which the bottoms of the first and second pistons 24, 26 face the hydraulic pressure chamber 30.

The main housing portion 28 is provided with a pair of to-be-attached portions 36, 37. The to-be-attached portions 36, 37 are respectively provided on both sides, in the direction perpendicular to the axis M, of an end portion of the main housing portion 28 on the side close to the rotor 3 in the axial direction. The to-be-attached portions 36, 37 extend radially inward of the rotor 3 and are attached to a suspension member being a non-rotary member such as a knuckle (which can also be referred to as a vehicle body side member).

Figure 3:
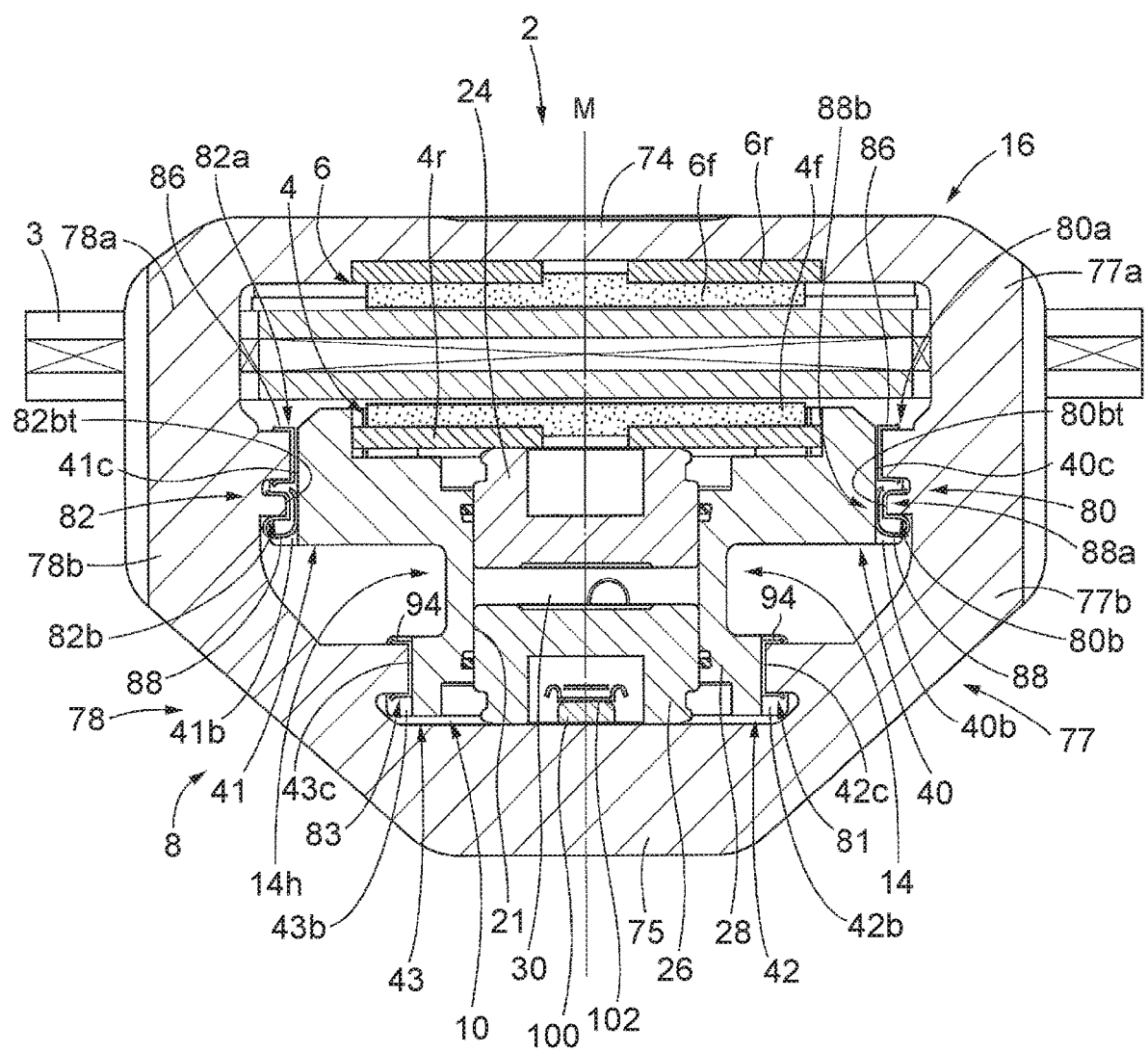
FIG. 3 is a sectional view of a pressing device of the disc brake.
Figure 4:
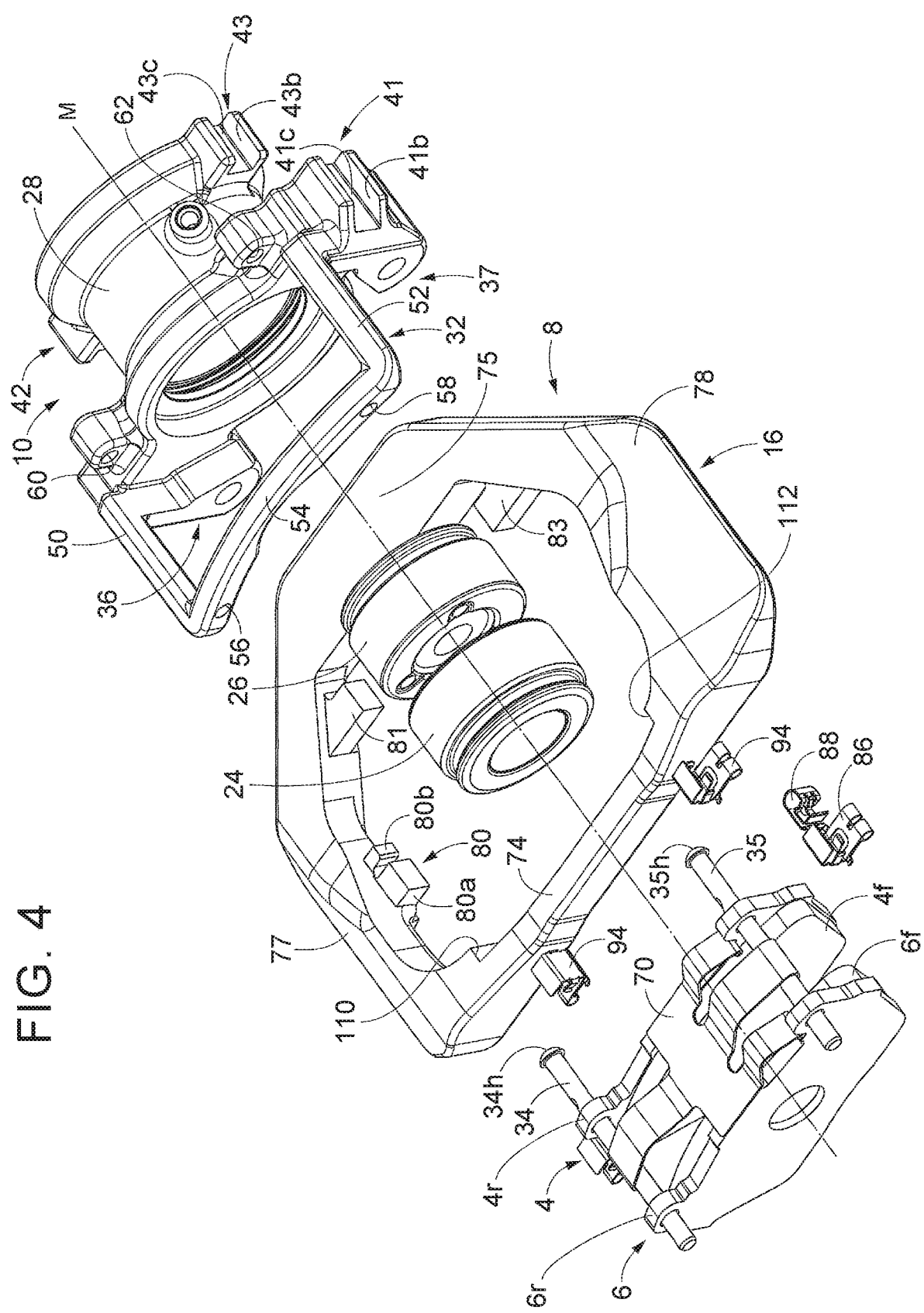
FIG. 4 is an exploded perspective view of a main portion of the disc brake.
Figure 6:
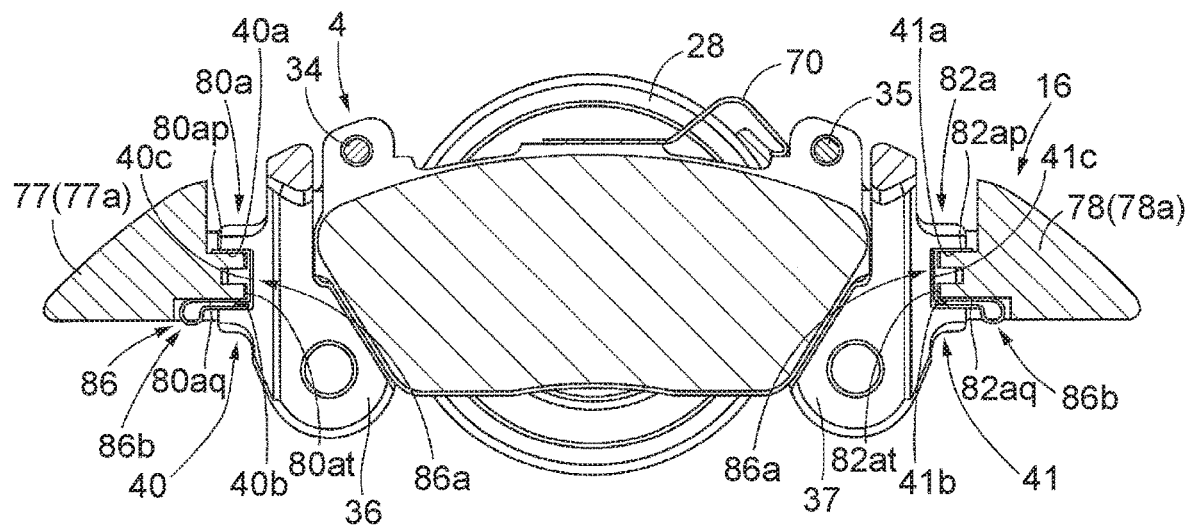
FIG. 6 is a sectional view taken along line VI-VI of FIG. 2.

The main housing portion 28 is provided with two pairs of to-be-engaged portions that are engageable with the frame 16. The two pairs of to-be-engaged portions are respectively provided at both end portions of the main housing portion 28 in the axial direction. Specifically, as shown in FIGS. 3 and 4, first engagement recess portions 40, 41 being the pair of to-be-engaged portions of the two pairs of to-be-engaged portions are respectively provided on both sides, in the direction perpendicular to the axis M, of the end portion of the main housing portion 28 on the side close to the rotor 3 in the axial direction, and second engagement recess portions 42, 43 being the other pair of to-be-engaged portions are respectively provided on both sides, in the direction perpendicular to the axis M, of the end portion of the main housing portion 28 on the side remote from the rotor 3 in the axial direction. In this embodiment, as shown in FIG. 6, the first engagement recess portions 40, 41 are respectively provided to the to-be-attached portions 36, 37. The radial center points of the first engagement recess portions 40, 41 and the second engagement recess portions 42, 43 are located approximately on a center reference plane S. The center reference plane S is a plane that is perpendicular to a reference line P being a line perpendicular to the rotation axis L of the rotor 3 and to a center line passing through the center of the first piston 24 and the center of the second piston 26 (being the same as the axis M) and that includes the axis M.

The first engagement recess portions 40, 41 and the second engagement recess portions 42, 43 each have a groove extending in the axial direction. For example, as shown in FIGS. 4 and 6, the first engagement recess portion 41 has a pair of wall surfaces 41a, 41b spaced apart from each other in the radial direction of the rotor 3 (hereinafter may be simply referred to as the radial direction) and a bottom surface 41c located between the wall surfaces 41a, 41b. The wall surfaces 41a, 41b each extend parallel to the center reference plane S. Likewise, the first engagement recess portion 40 and the second engagement recess portions 42, 43 each have a pair of wall surfaces and a bottom surface.

As shown in FIG. 4, the bridge portion 32 has a generally U-shape in plan view and has a first end portion fixed to one of the to-be-attached portions 36, 37 and a second end portion fixed to the other of the to-be-attached portions 36, 37. The bridge portion 32 includes a first rod 50 extending in the axial direction, a second rod 52 extending parallel to the first rod 50 and spaced apart from the first rod 50 in the circumferential direction of the rotor 3, and a connecting portion 54 connecting the first rod 50 and the second rod 52 together on the opposite side of the rotor 3 from the main housing portion 28. In this embodiment, the connecting portion 54 extends in the direction perpendicular to the axis M in plan view and may have an arbitrary shape. Through-holes 56, 58 each extending in the axial direction are respectively formed at both end portions of the connecting portion 54 in the circumferential direction of the rotor 3. Further, through-holes 60, 62 each extending in the axial direction are respectively formed at portions of the main housing portion 28 corresponding to the through-holes 56, 58.

The pad pins 34, 35 each extend in the axial direction and are respectively provided with heads 34h, 35h at first end portions thereof. The pad pins 34, 35 respectively pass through the through-holes 60, 62, through-holes formed in the back plates 4r, 6r of the inner pad 4 and the outer pad 6, and the through-holes 56, 58 in this order.

The pad pins 34, 35 are held by the main housing portion 28 at the first end portions thereof and by the bridge portion 32 at second end portions thereof, and thus are held by the housing 10 at both first and second end portions thereof. The heads 34h, 35h of the pad pins 34, 35 are located on the vehicle inner side of the through-holes 60, 62 of the main housing portion 28, and split pins (not shown) are respectively attached to the pad pins 34, 35 at portions on the opposite side (rotor side) of the through-holes 60, 62, thereby preventing coming-off of the pad pins 34, 35. Since the heads 34h, 35h are located on the vehicle inner side of the rotor 3, the pad pins 34, 35 are prevented from coming off to the vehicle outer side.

In this way, the inner pad 4 and the outer pad 6 are held to be movable in the axial direction by the pad pins 34, 35, but since the pad pins 34, 35 are provided so as to be spaced apart from each other in the circumferential direction, turning of the inner pad 4 and the outer pad 6 around the pad pins 34, 35 is suppressed.

A pad spring 70 in the form of a leaf spring is attached to intermediate portions of the pad pins 34, 35 at portions radially outward of the friction engagement members 4f, 6f. The pad spring 70 applies elastic forces to the inner pad 4 and the outer pad 6 in the radial and circumferential directions and applies elastic forces to the pad pins 34, 35 in the direction toward each other. By the pad spring 70, the backlash of the inner pad 4 and the outer pad 6 is suppressed so that the occurrence of vibration and noise is suppressed.

Figure 13:
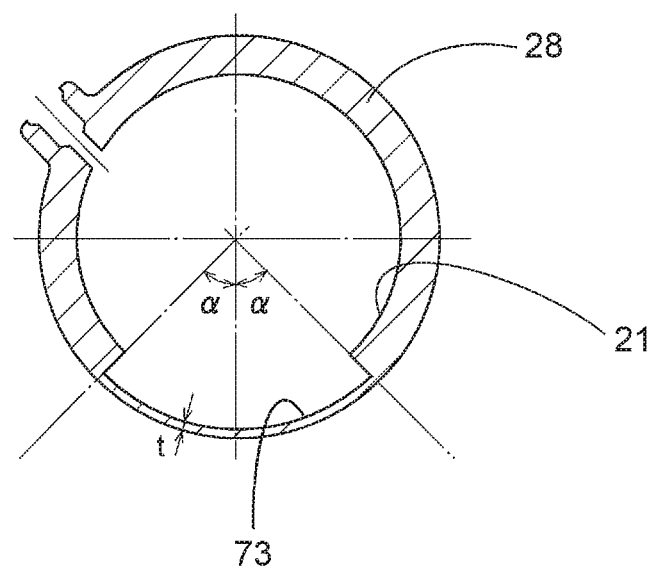
FIG. 13 is a sectional view taken along line XIII-XIII of FIG. 2.

The cylinder body 14h is provided with a fragile portion 71. The fragile portion 71 is provided at a portion Ra, shown in FIG. 2, of an intermediate portion of the cylinder body 14h, i.e. at "a portion that remains after portions where the first piston 24 and the second piston 26 slide are removed from a portion, corresponding to the hydraulic pressure chamber 30, of the cylinder body 14h". That is, in the portion, corresponding to the hydraulic pressure chamber 30, of the cylinder body 14h, the portion Ra is a portion between a bottom surface 24f of the first piston 24 and a bottom surface 26f of the second piston 26 in the non-operating state of the wheel cylinder 14. As shown in FIG. 13, the fragile portion 71 includes an arc-shaped recess 72 formed at an intermediate portion of a side portion of the main housing portion 28, and an arc-shaped cut-out recess 73 further formed at a middle portion, in the axial direction, of the recess 72. In this way, even when the fragile portion 71 is provided at the portion Ra, i.e. even when the recess 72 is formed so as to be open at "the portion that remains after the portions where the first piston 24 and the second piston 26 slide are removed from the portion, corresponding to the hydraulic pressure chamber 30 of the cylinder bore 21, of the cylinder body 14h", there is no influence on sliding of the first piston 24 and the second piston 26.

D. Frame

Figure 7:
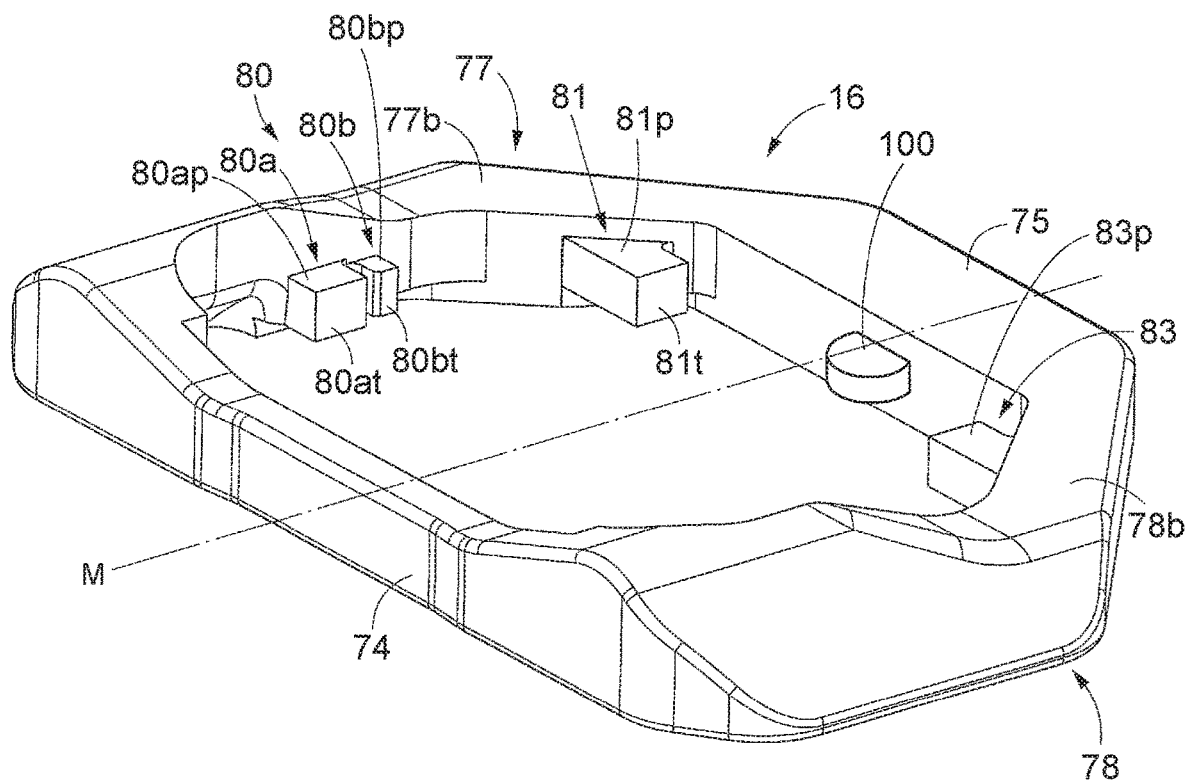
FIG. 7 is a perspective view showing a frame of the pressing device.

As shown in FIGS. 3, 4, and 7, the frame 16 is a generally frame-shaped rigid body and includes (i) a first side portion 74 and a second side portion 75 each extending in the direction perpendicular to the axis M and spaced apart from each other in the axial direction, and (ii) a third side portion 77 and a fourth side portion 78 each extending in the direction perpendicular to the first side portion 74 and the second side portion 75 and spaced apart from each other in the direction perpendicular to the axis M. The third side portion 77 and the fourth side portion 78 each connect the first side portion 74 and the second side portion 75 together.

The first side portion 74 and the second side portion 75 are located on the opposite sides of the rotor 3 in the axial direction. The first side portion 74 is located on the vehicle outer side of the rotor 3 and faces the outer pad 6. The second side portion 75 is located on the vehicle inner side of the rotor 3 and engaged with the second piston 26.

Figure 5:
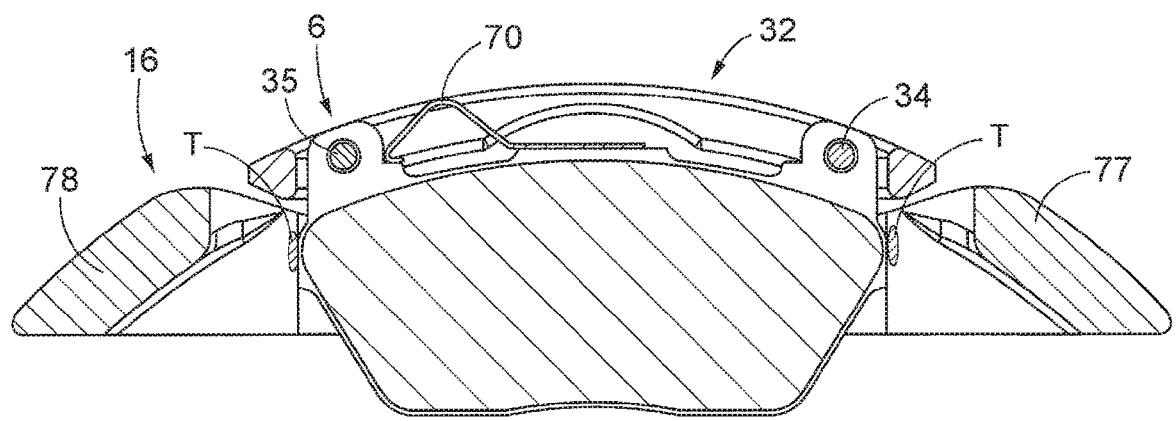
FIG. 5 is a sectional view taken along line V-V of FIG. 2.

The third side portion 77 and the fourth side portion 78 are each provided to extend to the vehicle inner side and to the vehicle outer side of the rotor 3. As shown in FIGS. 5 and 6, the third side portion 77 and the fourth side portion 78 are provided across the rotor 3 without being located radially outward of the inner pad 4 and the outer pad 6. In other words, as shown in FIGS. 3, 4, and 7, the third side portion 77 and the fourth side portion 78 are bent such that the interval between portions 77a, 78a located radially outward of the rotor 3 is greater than the interval between portions 77b, 78b located on the vehicle inner side of the rotor 3 (hereinafter, the portions 77b, 78b may be referred to as the inner side portions 77b, 78b). The inner pad 4 and the outer pad 6 are located between the interval-greater portions 77a, 78a.

Two pairs of engagement portions are provided on side surfaces, facing each other, of the inner side portions 77b, 78b of the third side portion 77 and the fourth side portion 78 so as to be spaced apart from each other in the axial direction. First engagement projecting portions 80, 82 being the pair of engagement portions of the two pairs of engagement portions are respectively located at rotor-side end portions of the inner side portions 77b, 78b, and second engagement projecting portions 81, 83 being the other pair of engagement portions are respectively located at end portions of the inner side portions 77b, 78b on the side remote from the rotor 3. The first engagement projecting portions 80, 82 and the second engagement projecting portions 81, 83 have shapes that are respectively engageable with the first engagement recess portions 40, 41 and the second engagement recess portions 42, 43. The radial center points of the first engagement projecting portions 80, 82 and the second engagement projecting portions 81, 83 are located approximately on the center reference plane S.

The first engagement projecting portions 80, 82 each include two projecting portions spaced apart from each other with a gap therebetween in the axial direction. Specifically, the first engagement projecting portion 80 includes two projecting portions 80a, 80b, and the first engagement projecting portion 82 includes two projecting portions 82a, 82b. The first engagement projecting portions 80 (80a, 80b), 82 (82a, 82b) and the second engagement projecting portions 81, 83 each have a generally rectangular parallelepiped shape protruding in the direction perpendicular to the axis M and each have a pair of side surfaces radially spaced apart from each other and parallel to the center reference plane S, a top surface located between the side surfaces, and so on. For example, as shown in FIGS. 3, 6, and 7, the projecting portion 80a of the first engagement projecting portion 80 has side surfaces 80ap, 80aq, and a top surface 80at. This also applies to the first engagement projecting portion 82 and the second engagement projecting portions 81, 83, i.e. each having a pair of side surfaces parallel to the center reference plane S and a top surface.

The first engagement projecting portions 80, 82 of the frame 16 are respectively engaged with the first engagement recess portions 40, 41 of the main housing portion 28, and the second engagement projecting portions 81, 83 are respectively engaged with the second engagement recess portions 42, 43, so that the frame 16 is held by the main housing portion 28. In this case, the radial center points of the first engagement projecting portions 80, 82 and the second engagement projecting portions 81, 83 and the radial center points of the first engagement recess portions 40, 41 and the second engagement recess portions 42, 43 are located on the center reference plane S. Therefore, the frame 16 is held by the main housing portion 28 on the plane that is the same as the center reference plane S. In other words, the radial center points of holding portions, holding the frame 16, of the main housing portion 28 (hereinafter may be referred to as the holding points) are located on the center reference plane S. The holding portion represents a portion where the engagement projecting portion and the engagement recess portion are engaged together.

The first engagement projecting portions 80, 82 and the second engagement projecting portions 81, 83 each have a pair of side surfaces extending parallel to the center reference plane S, and the first engagement recess portions 40, 41 and the second engagement recess portions 42, 43 each have a pair of wall surfaces extending parallel to the center reference plane S, wherein these side surfaces and wall surfaces, i.e. the surfaces, are engageable with each other. As a result, the frame 16 is held by the main housing portion 28 so as to be movable in the direction parallel to the axis M. Further, the inclination of the frame 16 relative to the main housing portion 28 is suppressed.

In this embodiment, a leaf spring as an elastic member is provided between each of the first engagement projecting portions 80, 82 and the second engagement projecting portions 81, 83 and a corresponding one of the first engagement recess portions 40, 41 and the second engagement recess portions 42, 43. Specifically, radial springs 86 are respectively attached to the projecting portion 80a of the first engagement projecting portion 80 and the projecting portion 82a of the first engagement projecting portion 82, circumferential springs 88 are respectively attached to the projecting portion 80b and the projecting portion 82b, and radial springs 94 are respectively attached to the second engagement projecting portions 81, 83.

Figure 8:
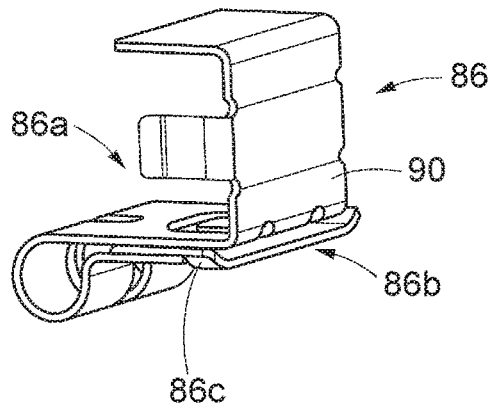
FIG. 8 is a perspective view showing a spring being a component of the disc brake.

As shown in FIG. 8, the radial spring 86 is formed by bending an elongated plate member 90 and includes a fitting portion 86a bent in a generally ]-shape and a spring portion 86b formed so as to be placed over a side surface of the fitting portion 86a with a gap therebetween. Further, an end portion of the spring portion 86b is partially bent with respect to the axial direction to provide an inclined portion 86c. For example, as shown in FIG. 6, the radial spring 86 is attached to the projecting portion 80a in the state where the projecting portion 80a is fitted in the fitting portion 86a in the radial direction and the spring portion 86b is located radially inward of the side surface 80aq of the projecting portion 80a. Since the radial spring 94 has the same shape as the radial spring 86, a description thereof will be omitted.

Figure 9:
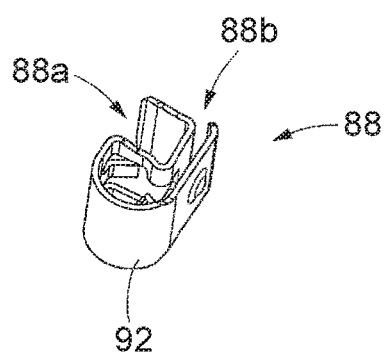
FIG. 9 is a perspective view showing another spring being a component of the disc brake.

As shown in FIG. 9, the circumferential spring 88 is likewise formed by bending an elongated plate member 92 and includes a fitting portion 88a and a spring portion 88b formed so as to be placed over a bottom surface of the fitting portion 88a with a gap therebetween. For example, as shown in FIG. 3, the circumferential spring 88 is attached to the projecting portion 80b in the state where the projecting portion 80b is fitted in the fitting portion 88a in the axial direction and the spring portion 88b is located circumferentially inward of the top surface 80bt of the projecting portion 80b.

As shown in FIGS. 3 and 6, the first engagement projecting portion 80 is engaged with the first engagement recess portion 40 such that the spring portion 86b of the radial spring 86 is located between the side surface 80aq of the projecting portion 80a and the wall surface 40b of the first engagement recess portion 40 and that the spring portion 88b of the circumferential spring 88 is located between the top surface 80bt of the projecting portion 80b and the bottom surface 40c of the first engagement recess portion 40. In this way, by providing the radial springs 86, 94 and the circumferential springs 88 between the main housing portion 28 and the frame 16, the positional deviation of the frame 16 relative to the main housing portion 28 in the radial and circumferential directions is absorbed. As a result, the positioning of the frame 16 can be achieved so that it is possible to reliably move the frame 16 in the axial direction. Further, since radial and circumferential external forces that act between the frame 16 and the main housing portion 28 are absorbed by the radial springs 86, 94 and the circumferential springs 88, it is possible to suppress the occurrence of vibration and noise of the frame 16. Further, it is possible to improve the ease of assembly of the frame 16 to the main housing portion 28. Further, the insertion of the projecting portion 80a into the first engagement recess portion 40 is facilitated by the inclined portion 86c.

Figure 12:
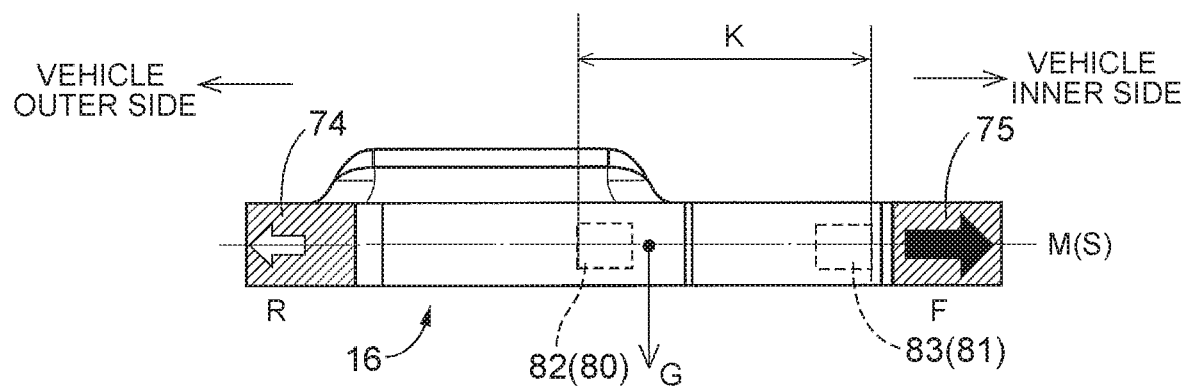
FIG. 12 is a diagram showing an operating state of the disc brake.

In this embodiment, as shown in FIG. 12, the frame 16 is designed such that, in side view, the center of gravity G is located between the holding portions, holding the frame 16, of the main housing portion 28 (range K), i.e. between an end face of the first engagement projecting portion 80, 82 on the vehicle outer side and an end face of the second engagement projecting portion 81, 83 on the vehicle inner side. Even when the frame 16 is moved in the axial direction, the center of gravity G does not deviate from the range K. When the inner pad 4 and the outer pad 6 are worn out, the position of the frame 16 relative to the main housing portion 28 in the non-operating state of the disc brake 2 is moved to the vehicle inner side. Therefore, even when the inner pad 4 and the outer pad 6 are worn out, the center of gravity G of the frame 16 is located in the range K.

Figure 10:
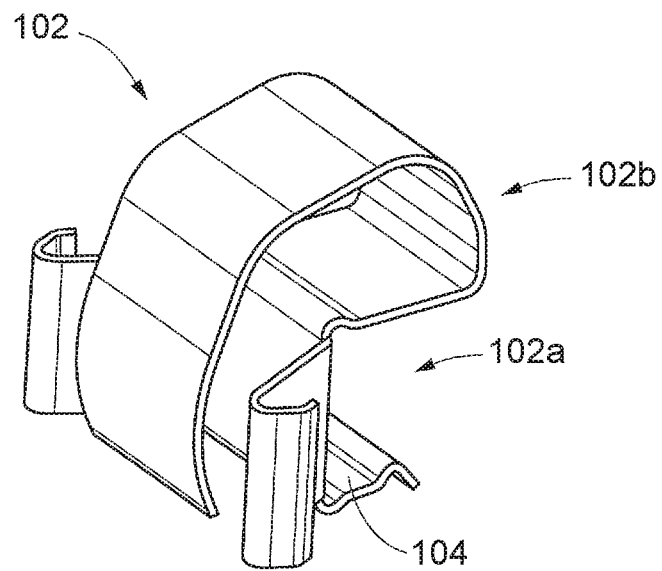
FIG. 10 is a perspective view showing still another spring being a component of the disc brake.

As shown in FIG. 7, a projecting portion 100 protruding in the axial direction is provided on a surface, facing the second piston 26, of the second side portion 75. The projecting portion 100 has a shape defined by a curved surface, i.e. a round shape, in the circumferential direction and is attached with a coupling spring 102 as an elastic member. As shown in FIG. 10, the coupling spring 102 is a leaf spring and is formed by bending a plate member 104. The coupling spring 102 includes a fitting portion 102a bent in a generally]-shape and a spring portion 102b formed so as to be placed over a side surface of the fitting portion 102a with an interval therebetween. Since the interval of the plate member 104 in the spring portion 102b is large, the spring force of the coupling spring 102 is small.

The coupling spring 102 is attached to the projecting portion 100 in the state where the projecting portion 100 is fitted in the fitting portion 102a in the radial direction and the spring portion 102b is located radially outward of the projecting portion 100. In this state, the projecting portion 100 is engaged with a hollow cylindrical portion 106 of the second piston 26 such that the spring portion 102b of the coupling spring 102 is located between the projecting portion 100 and an inner peripheral surface 106f of the hollow cylindrical portion 106 of the second piston 26. In this way, by the engagement between the frame 16 and the second piston 26 via the coupling spring 102, it is possible to integrally move the frame 16 and the second piston 26 in the axial direction while achieving the positioning of the frame 16 relative to the second piston 26 in the radial direction.

Consequently, when the disc brake 2 is released, the frame 16 can be moved in the direction of arrow Y in FIG. 11 along with the movement of the second piston 26 to return to the initial position (the position when the disc brake 2 is in the non-operating state), so that it is possible to quickly separate the outer pad 6 from the rotor 3 and thus suppress dragging of the outer pad 6. Further, since the projecting portion 100 has the round shape in the circumferential direction, it is suppressed that the frame 16 is difficult to turn in the operation of the disc brake 2 due to the engagement with the second piston 26 via the coupling spring 102. Further, since the spring force of the coupling spring 102 is small, pinching or the like of the second piston 26 is reliably avoided. Rubber or the like may be provided as an elastic member instead of the coupling spring 102.

In the frame 16 according to this embodiment, as shown in FIG. 2, the ratio (H/D) of a thickness (length in the radial direction) H of each of the first side portion 74 and the second side portion 75 of the frame 16 to a diameter D of the cylinder bore 21 of the main housing portion 28 is set to about 0.33. Since the ratio of the thickness of each of the first side portion 74 and the second side portion 75 to the diameter of the cylinder bore 21 is set to the relatively large value, the disc brake 2 can be reliably operated so that it is possible to improve the reliability. The ratio (H/D) is satisfactory if it is 0.17 or more, and is preferably 0.2 or more.

The frame 16 may be made of, for example, carbon fiber reinforced plastic (CFRP). Since the wheel cylinder 14 is formed in the main housing portion 28, high machining accuracy is not required for the frame 16. Therefore, when manufacturing the frame 16, the need for machining such as cutting or grinding becomes low so that, for example, the frame 16 can be manufactured by press working. The press working is suitable for processing the carbon fiber reinforced plastic.

Compared to a material containing iron, the carbon fiber reinforced plastic is poor in durability, but is light in weight. As a result, the travel distance relative to the power can be increased. A portion of the frame 16 that is adjacent to the outer pad 6 in the circumferential direction serves as a torque receiving portion, while the resin has high damping characteristics. Therefore, it is possible to suppress vibration and thus reduce noise in the operating state of the disc brake 2.

It is desirable to manufacture the third side portion 77 and the fourth side portion 78 such that the direction of carbon fibers coincides with the axial direction, i.e. the orientation of carbon fibers becomes high in the axial direction. Consequently, the strength against forces that act on the frame 16 in the axial direction can be made large so that it is possible to reliably suppress deformation of the frame 16 due to forces F, R.

E. Hydraulic Brake System

Figure 14:
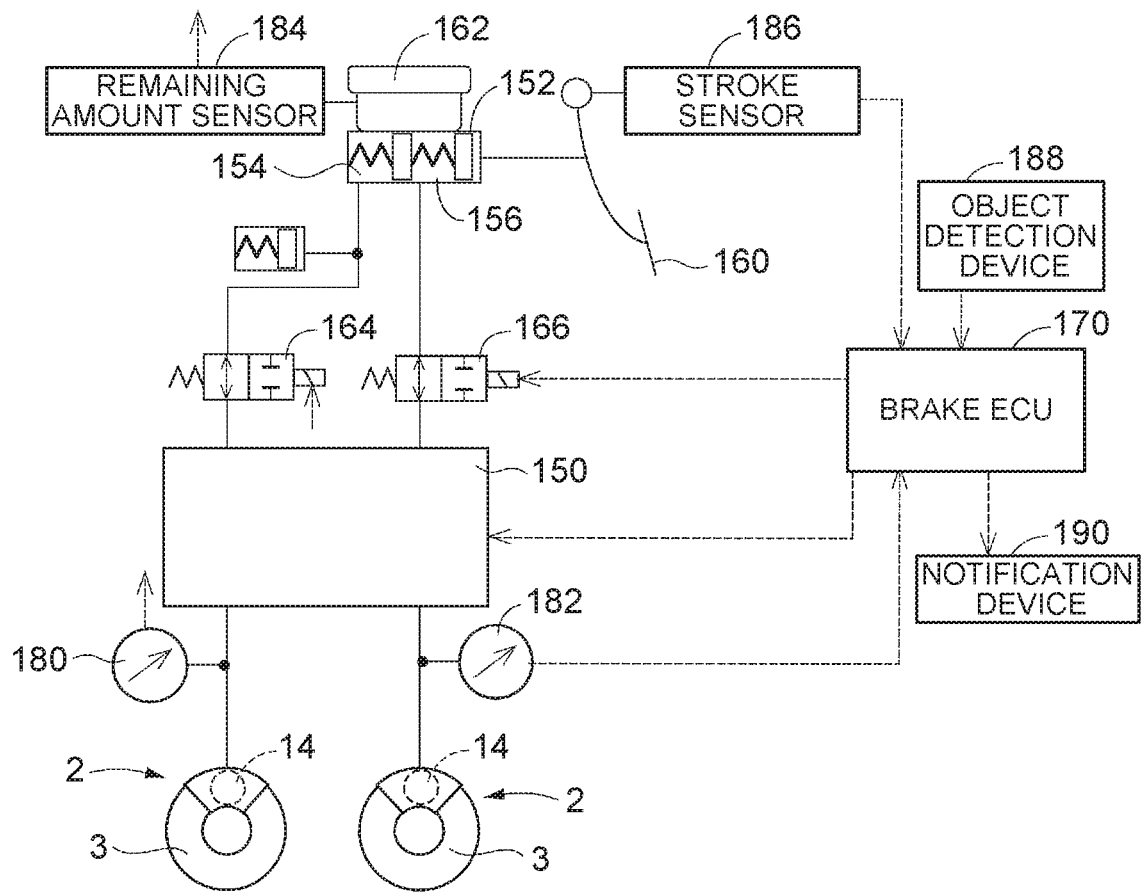
FIG. 14 is a diagram conceptually showing a hydraulic brake system including the hydraulic brake.

As shown in FIG. 14, pressurizing chambers 154, 156 of a master cylinder 152 are connected to the hydraulic pressure chambers 30 of the wheel cylinders 14 of the disc brakes 2 via a hydraulic pressure control unit 150. The master cylinder 152 includes two pressurizing pistons, and the pressurizing chambers 154, 156 are respectively provided in front of the pressurizing pistons. A brake pedal 160 as a brake operating member is linked to one of the two pressurizing pistons so that the hydraulic pressures are generated in the pressurizing chambers 154, 156 by the operation of the brake pedal 160.

A reservoir tank 162 is connected to the master cylinder 152. When the pressurizing pistons are located at the retreat end positions, communication is established between the pressurizing chambers 154, 156 and the reservoir tank 162. The working fluid returned from the hydraulic pressure chambers 30 of the wheel cylinders 14 to the pressurizing chambers 154, 156 is returned to the reservoir tank 162.

Master shut-off valves 164, 166 are provided between the pressurizing chambers 154, 156 and the hydraulic pressure control unit 150. In the closed state of the master shut-off valves 164, 166, the hydraulic pressures in the hydraulic pressure chambers 30 of the wheel cylinders 14 are controlled by the hydraulic pressure control unit 150.

Although the illustration is omitted, the hydraulic pressure control unit 150 may include, for example, a pump and a control valve device including one or more solenoid control valves. The reservoir tank 162 is connected to the hydraulic pressure control unit 150, and the pump draws up the working fluid from the reservoir tank 162, and pressurizes and discharges it. Mainly, the control valve device returns the working fluid from the wheel cylinders 14 to the reservoir tank 162 so as to reduce the hydraulic pressures in the wheel cylinders 14. The hydraulic pressures in the wheel cylinders 14 are controlled by controlling at least one of a pump motor that drives the pump, and the solenoid control valve.

In this embodiment, a brake ECU 170 including a computer as a main component is provided. Wheel cylinder pressure sensors 180, 182, a remaining amount sensor 184, a stroke sensor 186, an object detection device 188, and so on, and further, the hydraulic pressure control unit 150, the master shut-off valves 164, 166, a notification device 190, and so on, are connected to input/output portions of the brake ECU 170.

The wheel cylinder pressure sensors 180, 182 respectively detect the hydraulic pressures in the hydraulic pressure chambers 30 of the wheel cylinders 14 (hereinafter may be referred to as the wheel cylinder pressures). The remaining amount sensor 184 detects the reservoir remaining amount being the amount of the working fluid stored in the reservoir tank 162. The stroke sensor 186 detects the stoke of the brake pedal 160. The object detection device 188 detects objects (vehicle, person, stationary object, etc.) that are present around the vehicle. The object detection device 188 includes at least one of a camera and a radar and detects objects around the vehicle based on a captured image from the camera, a signal from the radar, and so on. The notification device 190 includes a display or a sound generation device and notifies a state of the hydraulic brake system, or the like.

F. Operation in Hydraulic Brake System

In the hydraulic brake system configured as described above, when the working fluid is supplied from the pressurizing chambers 154, 156 of the master cylinder 152 or the hydraulic pressure control unit 150 to the hydraulic pressure chambers 30 of the disc brakes 2, the disc brakes 2 are operated. On the other hand, since the disc brakes 2 are each provided with the fragile portion 71, when the number of times of operation of the disc brake 2 is increased, the fragile portion 71 tends to be damaged so that the leakage of the working fluid tends to occur. However, the leakage amount due to damage of the cut-out recess 73 is small. In the case where the fragile portion 71 is designed such that durability of the fragile portion 71 is the poorest in the disc brake 2, it is expected that at the time when the fragile portion 71 is damaged to cause the leakage, the other portion of the disc brake 2 is not damaged. In other words, even when the fragile portion 71 is damaged to cause the leakage, the disc brake 2 is still operable and is capable of suppressing the rotation of the wheel.

Consequently, it can be considered that the time when the leakage has occurred in the fragile portion 71 is the time when it is desirable to perform maintenance of the disc brake 2 or replace at least part of the disc brake 2. The durability of the fragile portion 71, i.e., for example, as shown in FIG. 13, a thickness t of the main housing portion 28 at the fragile portion 71 and a central angle $2\alpha$ corresponding to the length of an arc of the recess 72, 73, is designed such that the leakage in the fragile portion 71 serves as an indicator that it is desirable to perform maintenance of the disc brake 2 or replace at least part (e.g. the frame 16) of the disc brake 2.

Figure 15:
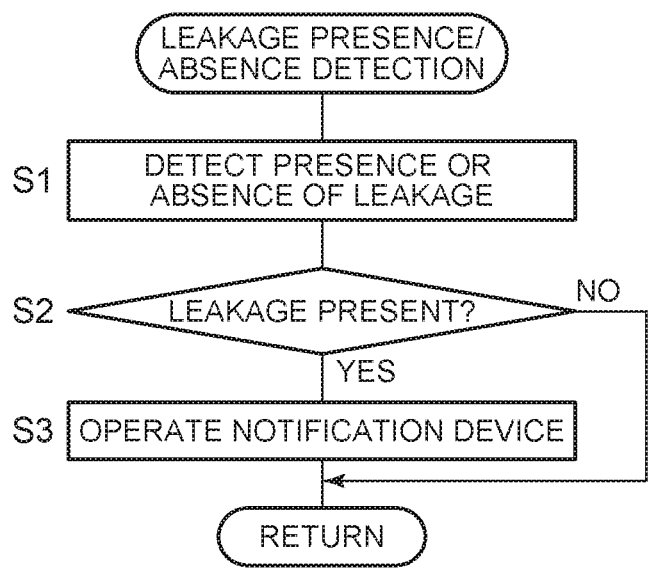
FIG. 15 is a flowchart showing a leakage detection program stored in a storage unit of a brake ECU of the hydraulic brake system.

Therefore, in this embodiment, the presence or absence of the leakage in the fragile portion 71 is detected by execution of a leakage presence/absence detection program in the brake ECU 170 and notified. The leakage presence/absence detection program is represented by a flowchart of FIG. 15 and executed at every predetermined set time. At step 1 (hereinafter abbreviated as S1; the same applies to the other steps), the presence or absence of the leakage is detected, and at S2, it is determined whether or not the detection result is "the leakage is present". When the detection result is "the leakage is present", a determination at S2 becomes YES so that the notification device 190 is operated at S3.

The presence or absence of the leakage can be detected, for example, by the following method. Detection of the presence or absence of the leakage is performed on the assumption that the other portion of the hydraulic brake system is normal.

(1) It can be configured that the leakage is detected to be present when the reservoir remaining amount detected by the remaining amount sensor 184 is less than a set amount. The set amount can be set to, for example, an amount that is necessarily stored in the reservoir tank 162 when there is no leakage. The set amount can be changed between when the reservoir remaining amount is detected in the non-operating state of the disc brake 2 and when it is detected in the operating state of the disc brake 2.

(2) In the open state of the master shut-off valves 164, 166, the hydraulic pressures in the pressurizing chambers 154, 156 are increased by an increase in the stroke of the brake pedal 160 so that the working fluid is supplied from the pressurizing chambers 154, 156 to the wheel cylinders 14 to increase the hydraulic pressures in the hydraulic pressure chambers 30 of the wheel cylinders 14. The relationship between the stroke and the wheel cylinder pressure when there is no leakage is determined, and this relationship is acquired and stored in advance. Consequently, it can be configured that when the wheel cylinder pressure detected by the wheel cylinder pressure sensor 180, 182 (hereinafter referred to as the detected wheel cylinder pressure) is less than a wheel cylinder pressure, determined based on the relationship and the stroke of the brake pedal 160 measured by the stroke sensor 186, by a set pressure or more, the leakage is detected to be present in the corresponding wheel cylinder 14.

(3) In the closed state of the master shut-off valves 164, 166, a target hydraulic pressure is acquired based on the operating state of the brake pedal 160, the relative positional relationship between an object around the vehicle detected by the object detection device 188 and the vehicle (the subject vehicle, i.e. the own vehicle), or the like, and the hydraulic pressure control unit 150 is controlled based on the target hydraulic pressure. When there is no leakage, the detected wheel cylinder pressure and the target hydraulic pressure should be approximately equal to each other by the control of the hydraulic pressure control unit 150. Consequently, it can be configured that when the detected wheel cylinder pressure is less than the target hydraulic pressure by a set pressure or more, the leakage is detected to be present in the corresponding wheel cylinder 14.

As described above, in this embodiment, when the leakage is detected to be present in the wheel cylinder 14, this is notified. When, by this notification, the maintenance of the disc brake 2 is performed or at least part (e.g. the frame 16) of the disc brake 2 is replaced, it is possible to prevent damage to the frame 16. Therefore, the frame 16 can be manufactured using the carbon fiber reinforced plastic so that it is possible to reduce the weight thereof. Further, it is also possible to reduce the weight of other portions of the disc brake 2 within a range where durability thereof is higher than that of the fragile portion 71.

In the disc brake 2, as shown in FIG. 12, the lines of action of the forces F, R are located in the same plane (in this embodiment, in the center reference plane S). Therefore, it is possible to suppress the inclination of the frame 16 in the operation of the disc brake 2. Further, since the lines of action of the forces F, R and the center points of the holding portions, holding the frame 16, of the main housing portion 28 are located on the same plane, it is possible to suppress deformation of the frame 16 in the operating state of the disc brake 2 and thus suppress a reduction in pressing force that is otherwise caused by such deformation of the frame 16.

The pad pins 34, 35 are each held by the housing 10 at both end portions thereof. Therefore, the postures of the inner pad 4 and the outer pad 6 can be stably held, and it is possible to reliably suppress radially inward sliding-down of the outer pad 6.

Further, the pad pins 34, 35 are attached to the housing 10 without using screw fastening. As a result, it is possible to reduce the processing cost and improve the workability. Since the screw fastening is not used, it is easy to detach the pad pins 34, 35 so that the work of replacing the inner pad 4 and the outer pad 6 is facilitated.

In the fragile portion 71, the length of the recess 72 and the cut-out recess 73 does not matter. For example, the recess 72 and the cut-out recess 73 can be provided in an annular shape.

The fragile portion 71 can be provided at "any portion, corresponding to the hydraulic pressure chamber 30, of the intermediate portion of the cylinder body 14h", i.e. not limited to "a portion that remains after portions where the first piston 24 and the second piston 26 slide are removed from a portion, corresponding to the hydraulic pressure chamber 30, of the cylinder body 14h". In other words, the fragile portion 71 can be provided at "one of the portions, where the first piston 24 and the second piston 26 slide, in the portion, corresponding to the hydraulic pressure chamber 30, of the cylinder body 14h", for example, at "a portion of the cylinder body 14h, corresponding to one of portions between the bottom surfaces 24f, 26f of the first and second pistons 24, 26 and the piston seals 24s, 26s in the non-operating state of the wheel cylinder 14".

When round portions 24r, 26r are formed at the edges of the bottom portions of the first piston 24 and the second piston 26, the fragile portion 71 can be provided in the cylinder body 14h at a portion including portions facing the round portions 24r, 26r of the first piston 24 and the second piston 26. This is because even when the opening of the recess 72 is located at the portions, facing the round portions 24r, 26r, of the cylinder bore 21 of the cylinder body 14h, the influence on sliding of the first piston 24 and the second piston 26 is small.

The presence or absence of the leakage can be detected using various other methods, i.e. not limited to the method in this embodiment.

Second Embodiment

Figure 16:
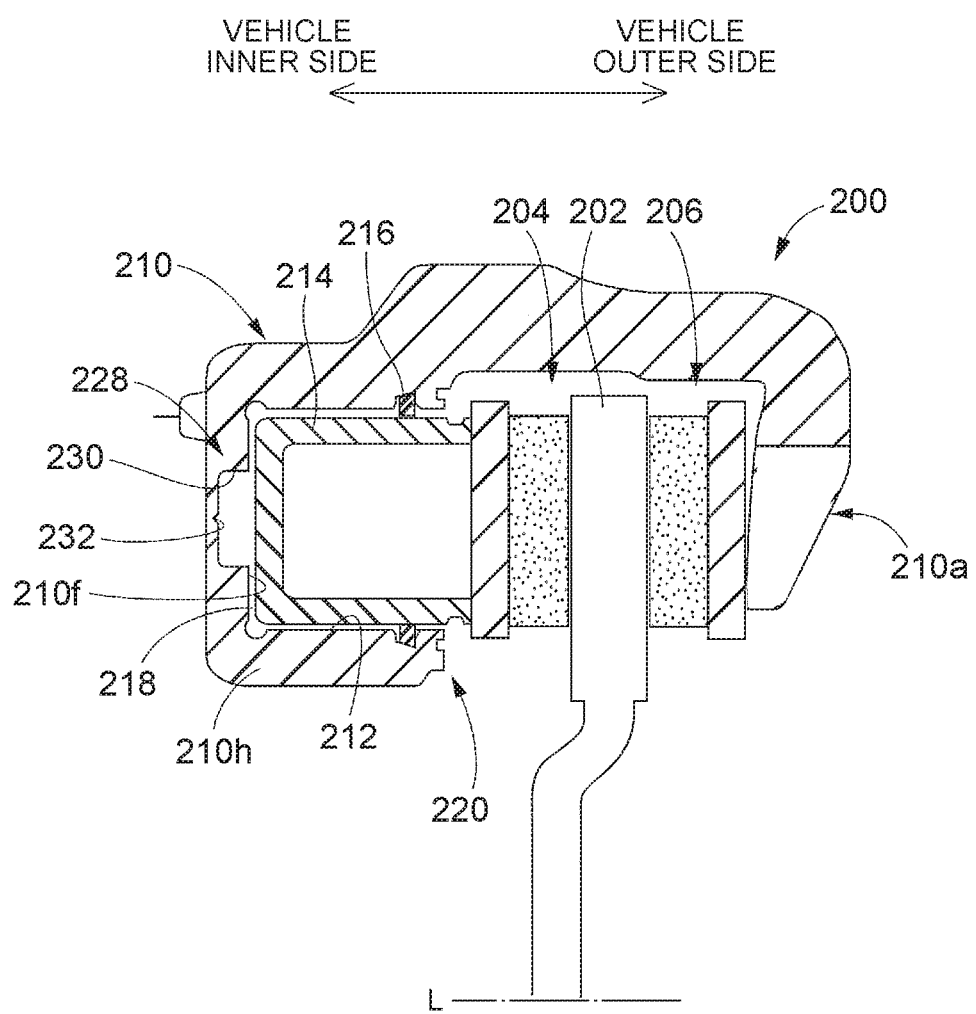
FIG. 16 is a sectional view of a disc brake being a hydraulic brake according to a second embodiment of the disclosure.

A hydraulic brake according to the disclosure can be applied to a disc brake 200 shown in FIG. 16. The hydraulic disc brake 200 includes (I) an inner pad 204 and an outer pad 206 that are located on both sides of a rotor 202 so as to sandwich the rotor 202 therebetween, (II) a caliper 210 held by a non-rotary member (not shown) so as to be movable in the axial direction, and so on. The caliper 210 is provided across the rotor 202, the inner pad 204, and the outer pad 206. In the caliper 210, a portion located on the vehicle inner side serves as a cylinder body 210h formed with a bottomed cylinder bore 212, and a portion located on the vehicle outer side serves as a lug portion 210a.

In the caliper 210, a piston 214 is liquid-tightly and slidably fitted in the cylinder bore 212 via a piston seal 216. In this embodiment, a portion between a bottom surface 210f of a bottom portion of the cylinder body 210h of the caliper 210 and the piston seal 216 serves as a hydraulic pressure chamber 218. A wheel cylinder 220 is formed by the cylinder body 210h, the piston 214, the hydraulic pressure chamber 218, and so on.

The lug portion 210a is located outward of the outer pad 206. The caliper 210 is moved in the direction parallel to the rotation axis L of the rotor 202 by the hydraulic pressure in the hydraulic pressure chamber 218 so that the lug portion 210a presses the outer pad 206 against the rotor 202.

In this embodiment, a fragile portion 228 is provided on the bottom surface 210f of the cylinder body 210h. The fragile portion 228 includes a recess 230 extending generally in the diameter direction and a cut-out recess 232 formed at a middle portion of the recess 230 in the direction crossing the recess 230. The bottom surface 210f corresponds to a portion that remains after a sliding portion of the piston 214 is removed from a portion, corresponding to the hydraulic pressure chamber 218, of an inner peripheral surface of the cylinder body 210h.

In the disc brake 200 according to this embodiment, while the strength of the lug portion 210a of the caliper 210 is less than that of the other portions, the cylinder body 210h is provided with the fragile portion 228. In a hydraulic brake system according to this embodiment, when the fragile portion 228 is damaged to cause the leakage, this is notified. When, according to this notification, the maintenance of the disc brake 200 is performed or at least part (e.g. the caliper 210) of the disc brake 200 is replaced, it is possible to prevent damage to the lug portion 210a. As a result, it is possible to reduce the weight of the caliper 210 by, for example, manufacturing at least part of the caliper 210 using the carbon fiber reinforced plastic.

The recess 230 of the fragile portion 228 may have a generally circular shape.

In addition to the embodiments described above, the disclosure can be carried out in various modes in which various changes or improvements are made based on knowledge of those skilled in the art.

Configurations including some of the features of the present disclosure is described below. (1) A hydraulic brake including: an inner pad and an outer pad located to sandwich therebetween a rotor configured to rotate with a wheel; a wheel cylinder including a cylinder body formed with a cylinder bore, a hydraulic pressure chamber formed in the cylinder body, and a piston liquid-tightly and slidably fitted in the cylinder bore and configured to be moved by a hydraulic pressure in the hydraulic pressure chamber so as to press the inner pad against the rotor; and a drive member configured to be moved in a direction opposite to the piston by the hydraulic pressure in the hydraulic pressure chamber so as to press the outer pad against the rotor, wherein a fragile portion is provided at a portion, corresponding to the hydraulic pressure chamber, of the cylinder body. The fragile portion is a portion where durability is less than that of the other portions. For example, a portion, where the thickness is reduced, of the cylinder body can be the fragile portion.

(2) The hydraulic brake according to (1), wherein the fragile portion is provided at a portion, outside a sliding portion of the piston, of the cylinder body. The sliding portion of the piston represents a portion where the piston slides on the cylinder body.

(3) The hydraulic brake according to (1) or (2), wherein the fragile portion is a recessed portion formed in the cylinder body and extending in an arc shape or in a straight line. Alternatively, the fragile portion may have a shape extending annularly or may have a circular shape, a rectangular shape, or the like. For example, the shape and size of the fragile portion can be designed in consideration of the thickness of the cylinder body at the fragile portion such that the leakage due to damage to the fragile portion can serve as an indicator of the maintenance time of the hydraulic brake or the replacement time of at least part of the hydraulic brake.

(4) The hydraulic brake according to any one of (1) to (3), wherein the cylinder bore is formed through the cylinder body and the fragile portion is provided at a side portion of the cylinder body. For example, the fragile portion can be provided at an inner peripheral surface of the side portion of the cylinder body.

(5) The hydraulic brake according to any one of (1) to (3), wherein the fragile portion is provided at a bottom portion of the cylinder body.

(6) The hydraulic brake according to any one of (1) to (5), wherein at least part of the drive member is manufactured using carbon fiber reinforced plastic. The drive member is higher in durability than the fragile portion.

(7) The hydraulic brake according to any one of (1) to (6), wherein: the hydraulic brake includes a housing attached to a non-rotary member and holding the inner pad and the outer pad; the cylinder bore is formed in the housing; the cylinder body is a portion, where the cylinder bore is formed, of the housing; the wheel cylinder further includes a second piston in addition to a first piston being the above-described piston, the second piston liquid-tightly and slidably fitted in the cylinder bore and configured to be moved in the direction opposite to the first piston by the hydraulic pressure in the hydraulic pressure chamber; and the drive member is a frame held by the housing so as to be relatively movable, the frame being a frame-shaped rigid body and configured to be moved in the direction opposite to the first piston by the second piston.

(8) The hydraulic brake according to (7), wherein the frame is provided across the rotor, but not across the inner pad or the outer pad, and includes a portion to be engaged with the second piston and a portion to be engaged with the outer pad.

(9) The hydraulic brake according to any one of (1) to (3), (5), and (6), wherein: the drive member is a caliper held by a non-rotary member so as to be movable in a direction parallel to a rotation axis of the rotor; the cylinder bore is formed in the caliper; and the cylinder body is a portion, where the cylinder bore is formed, of the caliper.

(10) A hydraulic brake system including: the hydraulic brake according to any one of (1) to (9); a hydraulic pressure supply device connected to the hydraulic pressure chamber; a reservoir tank storing working fluid; a leakage presence/absence detection device configured to detect the presence or absence of leakage of the working fluid in the fragile portion based on at least a state of the hydraulic pressure supply device or a remaining amount of the working fluid stored in the reservoir tank; and a notification device configured to, when the leakage is detected to be present by the leakage presence/absence detection device, notify the detection of the presence of the leakage. The hydraulic pressure supply device may be a manual hydraulic pressure generating device (including a brake operating member, a master cylinder, etc.), a power hydraulic pressure source (a pump device that generates hydraulic pressure by power, or the like), a hydraulic pressure control device (a device that generates hydraulic pressure by power and is capable of controlling the hydraulic pressure), or the like.

What is claimed is:

1. A hydraulic brake comprising:
    an inner pad and an outer pad located to sandwich a rotor configured to rotate with a wheel between the inner pad and the outer pad;
    a wheel cylinder including:
        a cylinder body including a cylinder bore,
        a hydraulic pressure chamber formed in the cylinder body, and
        a first piston liquid-tightly and slidably fitted in the cylinder bore and configured to be moved by a hydraulic pressure in the hydraulic pressure chamber so as to press the inner pad against the rotor; and
    a drive member configured to be moved, by the hydraulic pressure in the hydraulic pressure chamber, in a direction opposite to a direction in which the first piston moves, so as to press the outer pad against the rotor,
    wherein the cylinder body includes a fragile portion at a portion corresponding to the hydraulic pressure chamber,
    wherein a thickness of the cylinder body at the fragile portion is less than a thickness of the cylinder body at a portion other than the fragile portion, and
    wherein the fragile portion includes an arc-shaped recess, the arc-shaped recess including an arc-shaped cut-out recess.

2. The hydraulic brake according to claim 1, wherein the fragile portion is provided at a portion, outside a sliding portion of the first piston, of the cylinder body.

3. The hydraulic brake according to claim 1, wherein at least part of the drive member is made of carbon fiber reinforced plastic.

4. The hydraulic brake according to claim 1, further comprising
    a housing attached to a non-rotary member and holding the inner pad and the outer pad, wherein:
    the cylinder bore is provided in the housing;
    the cylinder body is a portion, where the cylinder bore is formed, of the housing;
    the wheel cylinder includes a second piston, the second piston being liquid-tightly and slidably fitted in the cylinder bore and being configured to be moved in the direction, by the hydraulic pressure in the hydraulic pressure chamber, opposite to the direction in which the first piston moves; and
    the drive member is a frame held by the housing so as to be relatively movable, the frame being a frame-shaped rigid body and including a portion engaging the second piston and a portion facing the outer pad, the frame configured to be moved, by the second piston, in the direction opposite to the direction in which the first piston moves.

5. The hydraulic brake according to claim 1, wherein:
    the drive member is a caliper held by a non-rotary member so as to be movable in a direction parallel to a rotation axis of the rotor;
    the cylinder bore is provided in the caliper; and
    the cylinder body is a portion, where the cylinder bore is formed, of the caliper.

6. The hydraulic brake according to claim 1, wherein the fragile portion has a strength less than a strength of a portion of the cylinder body other than the fragile portion.

7. The hydraulic brake according to claim 1, wherein the fragile portion is provided at a position overlapping at least part of the hydraulic pressure chamber in an axial direction of the cylinder body.

* * * * *